(12) United States Patent
Esser et al.

(10) Patent No.: US 8,973,262 B2
(45) Date of Patent: Mar. 10, 2015

(54) METHOD FOR PRODUCING A PISTON RING

(75) Inventors: Johannes Esser, Odenthal (DE);
Hans-Gerd Kroeschel, Cologne (DE);
Steffen Hoppe, Overath (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 115 days.

(21) Appl. No.: 13/823,566

(22) PCT Filed: Aug. 13, 2011

(86) PCT No.: PCT/DE2011/001604
§ 371 (c)(1),
(2), (4) Date: Mar. 14, 2013

(87) PCT Pub. No.: WO2012/045293
PCT Pub. Date: Apr. 12, 2012

(65) Prior Publication Data
US 2013/0187341 A1    Jul. 25, 2013

(30) Foreign Application Priority Data
Oct. 9, 2010  (DE) .......................... 10 2010 048 079

(51) Int. Cl.
*B23P 15/08* (2006.01)
*B23P 15/06* (2006.01)
*F16J 9/20* (2006.01)

(52) U.S. Cl.
CPC . *B23P 15/06* (2013.01); *F16J 9/206* (2013.01)
USPC .............. 29/888.07; 29/888.074; 29/888.075; 29/888.076

(58) Field of Classification Search
USPC ......... 29/888.07, 888.074, 888.075, 888.076, 29/402.09, 402.11; 277/440, 442, 459, 277/460
See application file for complete search history.

(56) References Cited

U.S. PATENT DOCUMENTS

| 2,614,899 | A | 10/1952 | Phillips |
| 3,337,938 | A | 8/1967 | Prasee |
| 6,199,274 | B1 | 3/2001 | Preyer |
| 2002/0190476 | A1 | 12/2002 | Preyer |
| 2010/0176557 | A1 | 7/2010 | Peter-Klaus et al. |
| 2013/0181411 | A1* | 7/2013 | Esser ............................ 277/443 |
| 2013/0187340 | A1* | 7/2013 | Esser et al. .................... 277/442 |
| 2014/0008874 | A1* | 1/2014 | Esser ............................ 277/443 |

FOREIGN PATENT DOCUMENTS

| CN | 85 1 08421 | 6/1986 |
| CN | 1535358 | 10/2004 |
| CN | 101680545 | 3/2010 |
| DE | 197 52 720 | 7/2000 |
| DE | 100 02 282 | 9/2001 |

* cited by examiner

Primary Examiner — Ryan J Walters
(74) Attorney, Agent, or Firm — Jordan and Hamburg LLP

(57) ABSTRACT

Method for producing a piston ring having an axial height <2 mm, said piston ring having a radially outer running surface provided with at least one rail, a radially inner circumferential surface, and upper and lower flank surfaces extending therebetween, wherein said rail is provided with a contour that is tapered radially outwardly, thereafter the running surface, together with the flanks of the tapered rail, is provided with at least one wear-resistant layer, and then only the flank of the rail that is to form a scraping edge is subjected to at least partial material removal to form the scraping edge.

7 Claims, 6 Drawing Sheets

METHOD FOR PRODUCING A PISTON RING

BACKGROUND OF THE INVENTION

The invention relates to a method for producing a piston ring having an axial height <2 mm.

In the general prior art, the running surface of, for example, electroplated, profile-ground spiral expander rings with and without a profile, can be machined up to a ring height of 2 mm. Usually both rail flanks are machined symmetrically and inclusive of the outer groove. (One may also refer to the rails as "ridges," for example.)

DE 100 02 282 C1 discloses a method for producing an oil scraper piston ring as well as an oil scraper piston ring produced by the method. The method for producing the oil scraper piston ring, which includes at least one tapered running rail provided with a wear-resistant coating, is carried out by, prior to the application of the wear-resistant coating, producing a profile on each tapered running rail on the surface thereof which comprises the outer circumferential surface of the ring and the wear-resistant coated surface of which will be a running surface of the running rail, the profile including a radial elevation formed by a portion of the circumferential surface of the rail projecting radially outward from another circumferential portion thereof, and then providing the profile with at least the wear-resistant coating, and carrying out a predefinable removal of material from the coating at least in the region of the radial elevation in order to produce a running surface profile that is substantially uniform around the ring circumference, and then profile-grinding the running rail flanks so that a defined cylindrical remaining surface is produced in at the radial elevation.

Today, this technique is used on piston rings, in particular oil scraper piston rings, having a ring height of up to 2 mm. The unceasing development of internal combustion engines now demands a further adaptation of the piston ring height in ranges up to 1.5 mm or less. According to the current state of the art, such rings can no longer be profile-ground on the running surface because the axially smaller dimensioning of the running surface shape cannot be achieved by the available grinding disk technology.

SUMMARY OF THE INVENTION

While retaining the running surface shapes that have been used, to date, with success, on piston rings, the problem addressed by the invention is that of demonstrating a solution, even for piston rings having a size <2 mm, that not only allows machining the running surfaces such that a sharp scraping edge is provided, but is also economical.

This problem is solved by the present invention, which a method for producing a piston ring having an axial height <2 mm and the piston ring itself, the piston ring having a radially outer running surface provided with at least one rail, a radially inner circumferential surface, and upper and lower flank surfaces extending therebetween, in that said rail is provided with a contour that is tapered radially outwardly, thereafter the running surface, together with the rail flanks of the particular tapered rail, is provided with at least one wear-resistant layer, and then only the flank of said rail that forms a scraping edge is subjected to at least partial material removal.

The piston rings, in particular oil scraper piston rings, produced by the method according to the invention are preferably used in gasoline and diesel engines with a very high shape conforming capability and low tangential forces.

Currently, because only the wear-resistant layer on the flank of said rail that faces the crankcase is subjected to partial material removal, the other running surface areas of the piston ring that are not actively connected to the other friction partner can remain unmachined. In a manner differing from the prior art according to DE 100 02 282 C1, therefore, symmetrical machining, rather than asymmetrical machining, of the particular running rail takes place, as a result of which the cycle time during the profile grinding can be considerably increased in comparison to the prior art.

It is of particular advantage that the tool, in particular a grinding disk, need only machine said rail flank to approximately 30 to 90% of the depth of the particular outer groove, i.e., 30 to 90% of the rail flank height, in order to produce a sharp scraping edge. At the same time, over said 30 to 90% depthwise or heightwise removal, removal is across the entire width of the rail flank.

The subject matter of the invention is not only applicable to profiles as presented in DE 100 02 282 C1. Rather, oil scraper rings can also be machined that have a height <2 mm, preferably ≤1.5 mm, and that have a cylindrical rail surface without any further profiles. Here, too, a sharp scraping edge can be produced by the method according to the invention, in that a partial material removal is carried out on the rail flank facing toward the oil chamber.

The subject matter of the invention is shown on the basis of an exemplary embodiment and is described as follows and shown in the accompanying drawings.

Figure 1:
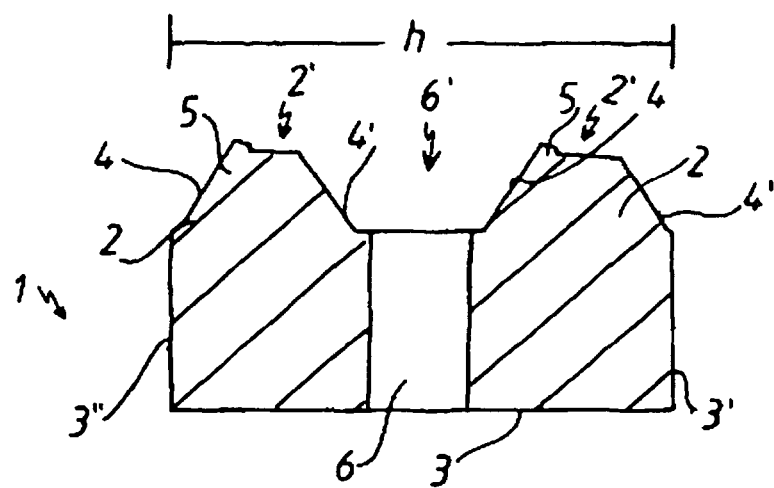
FIG. 1 shows a partial view of an oil scraper ring having a defined running surface profile and a total height of 1.5 mm.
Figure 2:
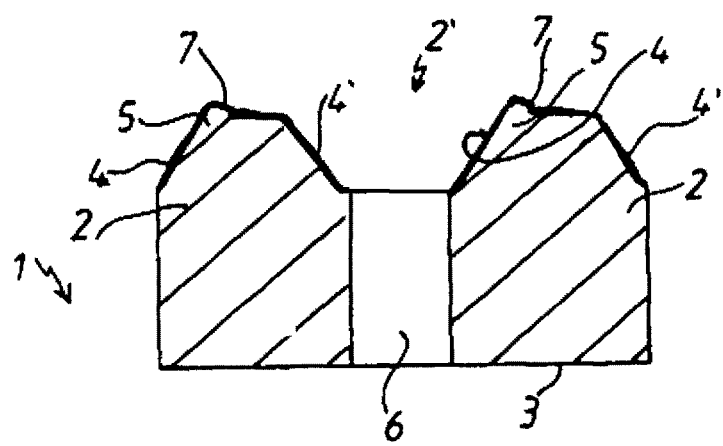
FIG. 2 shows the piston ring according to FIG. 1 with a coating on the running surface.
Figure 3:
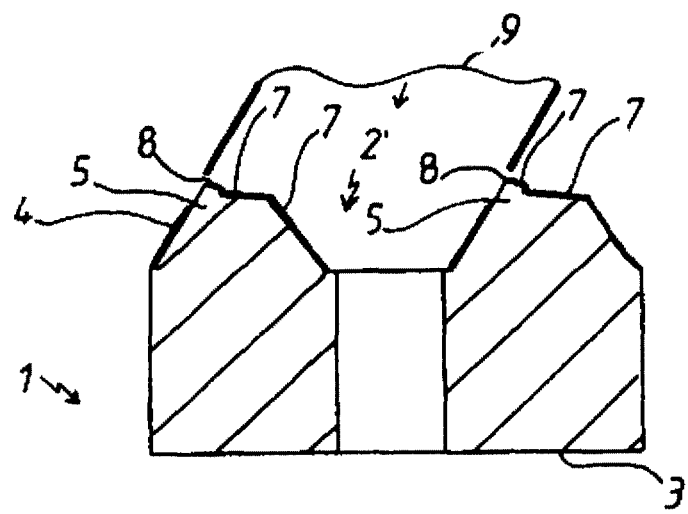
FIG. 3 shows a machining tool for machining a defined surface area of the running surface web.

As already discussed, an oil scraper ring shown in FIGS. 1 to 3 of DE 100 02 282 C1 can be used for ring heights of ≥2 mm and the running surface of the piston ring can also be machined symmetrically. For these applications, machining tools exist which allow the symmetrical machining of the two running rails simultaneously. For ring heights <2 mm, in particular ≤1.5 mm, symmetrical machining of the rails is no longer possible, since the technique reaches limitations with regard to the grinding disk shape.

FIG. 1 shows a piston ring main body 1, which in this example is intended to have a ring height h of 1.5 mm. The cross-sectional shape has been chosen to be analogous to DE 100 02 282 C1 so that, here too, identical machining criteria for producing the basic profile can be assumed. In a first operating step, running rails 2 are produced by mechanical machining such that the rail flanks 4, 4' taper linearly.

Each one of the rails 2 is machined in such a way that a radial elevation 5 is formed. Also visible are the oil drainage bores 6 that run from the groove bottom of the groove 6 formed between the rails 2 toward the inner circumferential surface 3. The upper ring flank 3' and the lower ring flank 3" extend between the running surface 2' and the inner circumferential surface 3.

As shown in FIG. 2, the piston ring main body 1, which is prepared in this way, is provided with a wear-resistant layer 7 in the area of the entire running surface 2', including the rails 2, the elevations 5 and the rail flanks 4, 4', only the oil drainage bores 6 being left without a wear-resistant layer.

In order to produce a sharp scraping edge 8 in the transition area between each elevation 5 and the associated rail flank 4, use is made of a grinding tool 9 (shown only schematically in FIG. 3) that machines only the transition area and frees the latter (as shown) of the wear-resistant material 7. The other areas of the running surface 2' remain unmachined. The piston ring main body 1 machined in this way then yields the finished oil scraper piston ring, which can be further subjected to a lapping process if necessary. In the operating state, the particular sharp scraping edge 8 faces toward a crankcase/oil chamber (not shown).

Figure 4:
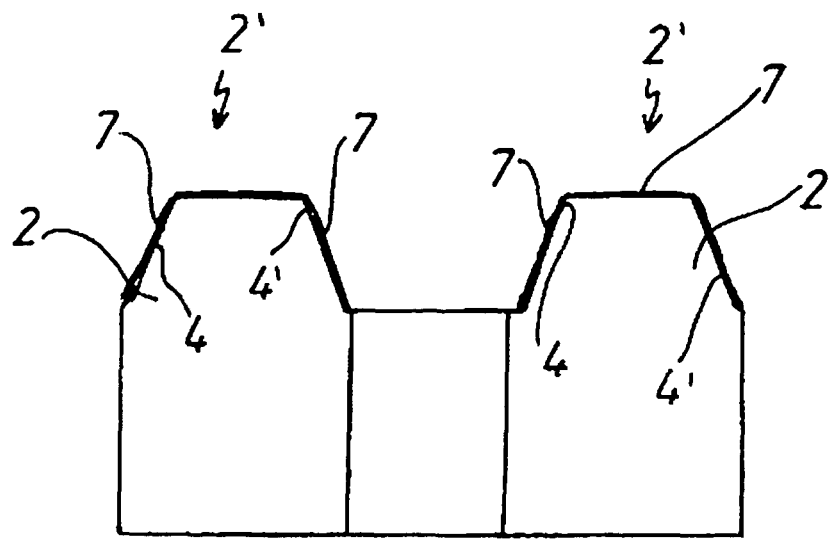
FIG. 4 shows a partial view of an oil scraper ring having a cylindrical running surface profile.
Figure 5:
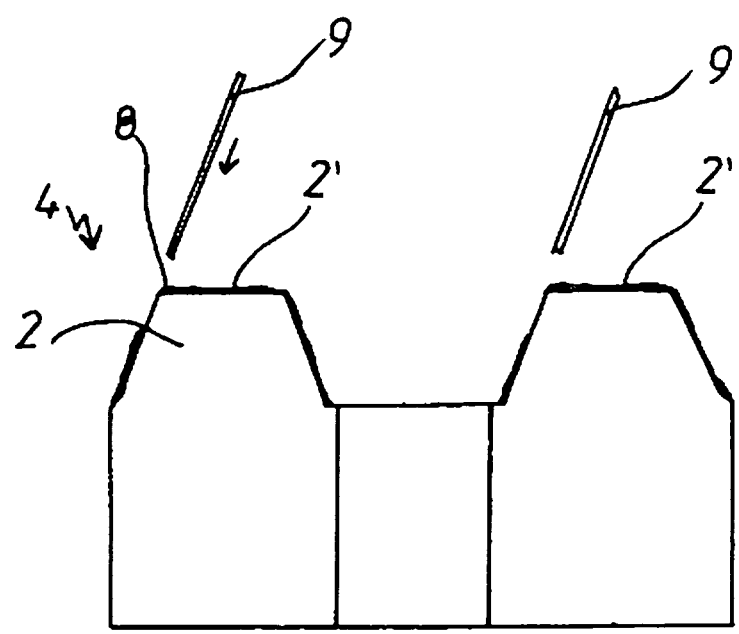
FIG. 5 shows a machining tool for machining a defined surface area of the running surface web.
Figure 6:
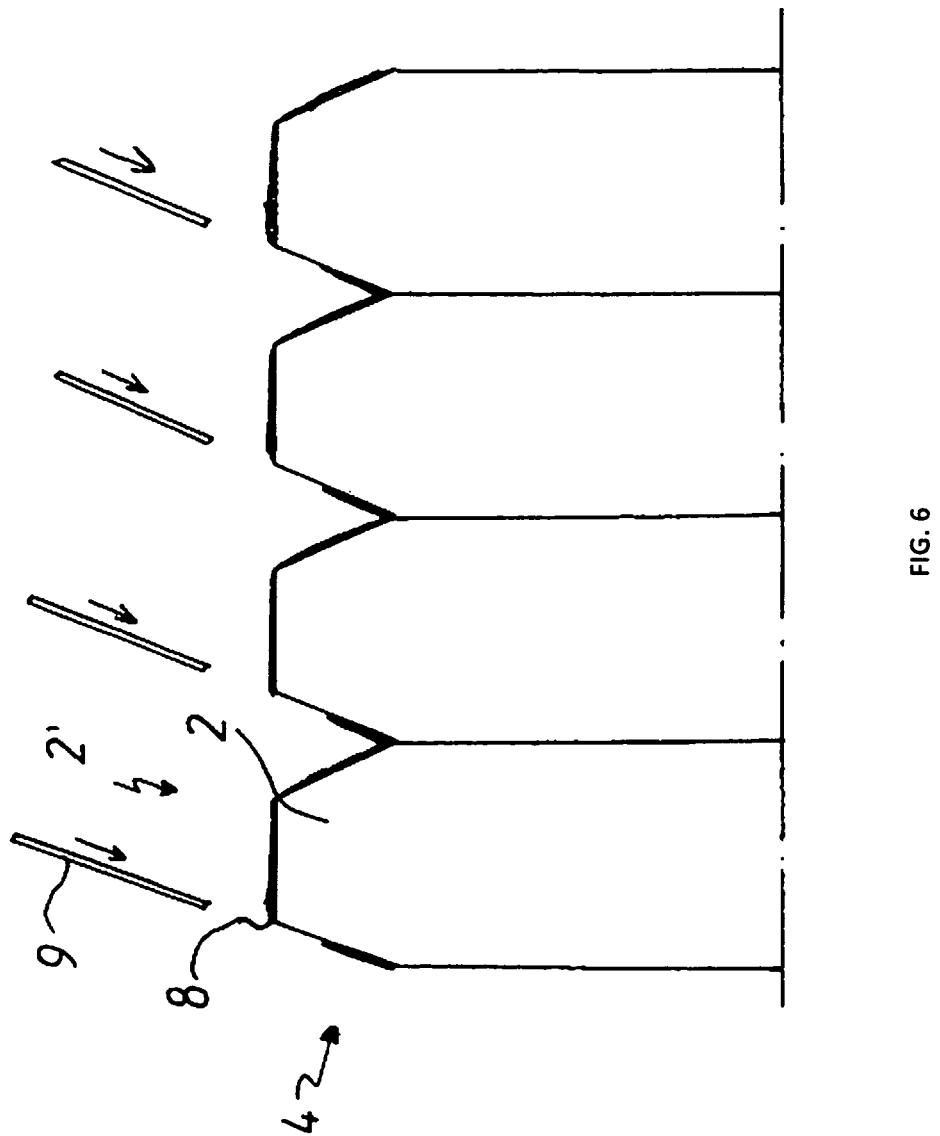
FIG. 6 shows an oil scraper ring provided with a rail, together with a schematically shown machining tool.

FIGS. 4 to 6 show alternative cross-sectional shapes of oil scraper piston rings. Where useful, the same reference signs are used analogously to FIGS. 1 to 3.

In terms of the machining state, FIG. 4 corresponds approximately to FIG. 2. FIG. 4 differs from FIGS. 1 to 3 in that said rail 2 has no profiling on the running surface 2' thereof facing toward a friction partner (not shown in any greater detail), but rather has been machined cylindrically. Otherwise the cross-sectional shape corresponds to that in FIGS. 1 to 3. A wear-resistant material 7 has likewise been applied to said rail flank 4, 4'.

FIG. 5 corresponds substantially to FIG. 3. The machining tool 9 can be fed in the direction of said rail flank 4 and removes wear-resistant material over a defined radial height of the rail 2 in the transition area from the cylindrical running surface 2' to the rail flank 4. By virtue of this measure, a sharp scraping edge 8 is formed in the transition area from the running surface 2' to the rail flank 4.

FIG. 6 shows a plurality of oil scraper rings assembled to form a block, said rings having only one single running surface rail 2 and in addition having a cross-sectional shape as in FIG. 4. The running surface 2' is also cylindrical here. Analogously to FIG. 5, the machining tool 9 removes wear-resistant material exclusively from the rail flank 4 over a defined radial height of the rail 2 in the transition area from the running surface 2' to the rail flank 4 in order to form a sharp scraping edge 8.

The invention claimed is:

1. A method for producing a piston ring of axial height <2 mm, comprising:
    providing, for further processing, a piston ring body of axial height <2 mm and comprising a circumferential rail, the circumferential rail having a radially outer circumferential surface which defines a radially outer circumferential surface of the piston ring body, the piston ring body also having a radially inner circumferential surface and piston ring upper and lower ring flanks extending between the radially outer and radially inner circumferential surfaces, the circumferential rail tapering in axial width parallel to an axis of the piston ring body and flanks of the rails converging toward each other as radial distance from the axis of the piston ring body increases;
    providing at least one wear-resistant layer on the radially outer circumferential surface and the rail flanks; and
    removing the at least one wear-resistant layer only in an area of each of the rail flanks which is contiguous with the radially outer circumferential surface thereby to provide a scraping edge at said a transition area.

2. The method of claim 1, wherein the rail faces a crankcase when the piston ring has been installed.

3. The method of claim 1, further comprising, after the applying of the wear-resistant layer, subjecting running surfaces of the piston ring, defined by the radially outer circumferential surface of the rail, to a cylindrical lapping process.

4. The method of claim 1, wherein the removing of the wear-resistant layer is effected by machining.

5. The method of claim 4, wherein the machining is by grinding.

6. The method of claim 4, wherein surfaces of the rail, other than the area from which the wear-resistant layer is removed by machining, are not subjected to machining.

7. The method of claim 4, wherein the radial flange area from which the wear-resistant layer is removed is 30 to 90% of height and across entire width of the rail flank.

* * * * *